United States Patent [19]
Naito

[11] Patent Number: 4,874,056
[45] Date of Patent: Oct. 17, 1989

[54] DRIVING FORCE DISTRIBUTION CONTROL SYSTEM FOR A 4 WHEEL DRIVE VEHICLE

[75] Inventor: Genpei Naito, Yokosuka, Japan

[73] Assignee: Nissan Motor Company, Limited, Yokohama, Japan

[21] Appl. No.: 127,319

[22] Filed: Dec. 2, 1987

[30] Foreign Application Priority Data

Dec. 3, 1986 [JP] Japan ............................. 61-288498

[51] Int. Cl.$^4$ ........................................ B60K 17/344
[52] U.S. Cl. ................................. 180/233; 364/424.1
[58] Field of Search ............... 180/197, 233, 247, 248; 74/866; 364/424.1

[56] References Cited

U.S. PATENT DOCUMENTS

| 4,757,870 | 7/1988 | Torii | 180/233 |
| 4,773,500 | 9/1988 | Naito et al. | 180/233 |
| 4,776,424 | 11/1988 | Naito | 180/233 |

FOREIGN PATENT DOCUMENTS

| 189176 | 7/1986 | European Pat. Off. | 180/233 |
| 3427725 | 8/1985 | Fed. Rep. of Germany | |
| 61-157437 | 7/1986 | Japan | |
| 61-157438 | 7/1986 | Japan | |
| 193931 | 8/1986 | Japan | 180/233 |
| 244627 | 10/1986 | Japan | 180/233 |
| 244628 | 10/1986 | Japan | 180/233 |

Primary Examiner—John A. Pekar
Attorney, Agent, or Firm—Foley & Lardner, Schwartz, Jeffery, Schwaab, Mack, Blumenthal & Evans

[57] ABSTRACT

A control system for controlling a driving torque distribution between front and rear axles of a four wheel drive vehicle includes a transfer clutch capable of continuously varying a torque transmitted to the front axle, front and rear wheel speed sensors for determining a front and rear wheel speed difference, a sensor for directly or indirectly sensing a lateral acceleration of the vehicle and a control unit. The control unit controls the transfer clutch in a characteristic such that the torque transmitted to the front axle is increased continuously and monotonically with an increase of the wheel speed difference at a steep rate when the lateral acceleration is low, and at a gradual rate when the lateral acceleration is high.

10 Claims, 11 Drawing Sheets

DRIVING FORCE DISTRIBUTION CONTROL SYSTEM FOR A 4 WHEEL DRIVE VEHICLE

CROSS REFERENCES TO RELATED APPLICATIONS

The following, commonly assigned, U.S. patent applications relate to driving force distribution control systems similar to the control system of the present invention:

(1) Ser. No. 830,015, filed on Feb. 18, 1986 now matured to U.S. Pat. No. 4,757,870; (2) Ser. No. 820,055, filed on Jan. 21, 1986 now matured to U.S. Pat. No. 4,754,834; (3) Ser. No. 906,309, filed on Sept. 12, 1986 now matured to U.S. Pat. No. 4,773,500; and (4) Ser. No. 893,245, filed on Aug. 5, 1986 now matured to U.S. Pat. No. 4,776,424.

BACKGROUND OF THE INVENTION

The present invention relates to a driving force distribution control system for a four wheel drive vehicle, and more specifically to a system for controlling a transfer clutch or the like for distributing the driving torque of an engine between front and rear axles.

Japanese patent provisional publication No. 61-157437 discloses one conventional example. A driving force distribution control system of this example is designed to vary the driving force distribution toward a state of four wheel drive by increasing an engagement force of a transfer clutch in accordance with an increased difference between sensed speeds of the front and rear wheels, in order to prevent slippage of the driving wheels.

However, this conventional control system is unable to respond to a change in the friction coefficient of a road surface, in a quick and adequate manner because the characteristic of the driving force distribution control is fixed. If, for example, the characteristic of the driving force distribution control is determined so as to suit a dry paved road (that is, the share of the driving torque transmitted to the front wheels is held relatively small), then the tendency to spin is increased on a road of a low friction coefficient due to ice or snow, so that the four wheel drive system cannot provide satisfactory driving stability and the ability of escaping from adverse road conditions. If, on the other hand, the control characteristic is determined so as to attain a sufficient stability of driving on a slippery road surface (that is, the share of the driving torque distributed to the front wheels is relatively high), then the driving torque transmitted to the front wheels becomes too much on a high friction coefficient road surface, and the tendency to drift-out is increased.

It is possible to meet these problems by employing a driver's manual selector switch for changing the control characteristic. However, such a manual switch is troublesome for average drivers, and does not respond to abrupt changes in road conditions.

SUMMARY OF THE INVENTION

It is an object of the present invention to provide a driving force distribution control system having an ability of adapting quickly and easily to changes in the friction coefficient of a road surface.

According to the present invention, a driving force distribution control system for a vehicle having at least a prime mover, primary driving wheels such as rear wheels and secondary driving wheels such as front wheels, comprises a transfer mechanism including at least a transfer clutch disposed in a drive path to the secondary wheels for varying a driving torque transmitted to the secondary wheels, a means for actuating the transfer clutch to vary a driving force distribution between the primary and secondary driving wheels in response to a control signal, a means for sensing a wheel speed difference between a revolving speed of the primary wheels and a revolving speed of the secondary wheels, a means for directly or indirectly sensing a lateral acceleration of the vehicle, a control means for producing the control signal and for increasing the driving torque transmitted to the secondary wheels through the transfer clutch with increased speed difference at a rate of increase which is decreased when the lateral acceleration is high and increased when the lateral acceleration is low.

DETAILED DESCRIPTION OF THE INVENTION

Figure 1:
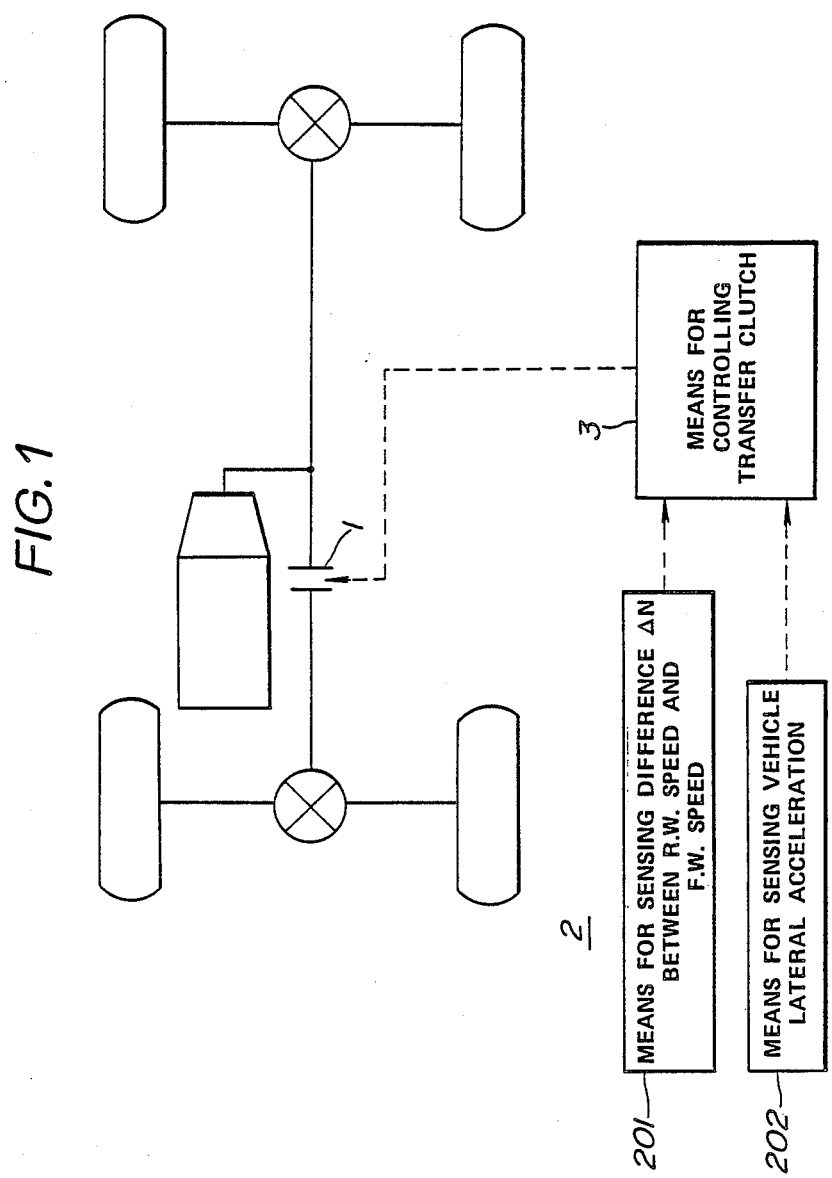
FIG. 1 is a schematic view showing a driving force distribution control system of the present invention.

As shown in FIG. 1, a driving force distribution control system of the present invention basically includes a transfer clutch 1, a sensor group 2 including a means 201 for sensing a difference $\Delta N$ between a rear wheel revolving speed and a front wheel revolving speed, and a lateral acceleration sensing means 202 such as a lateral acceleration sensor or a combination of a vehicle speed sensor and a steering angle sensor, and a controller means 3 generally including a control unit for controlling the transfer clutch 1, and an actuator for actuating the transfer clutch under the command of the control unit.

A first embodiment of the present invention is shown in FIGS. 2-9.

Figure 2:
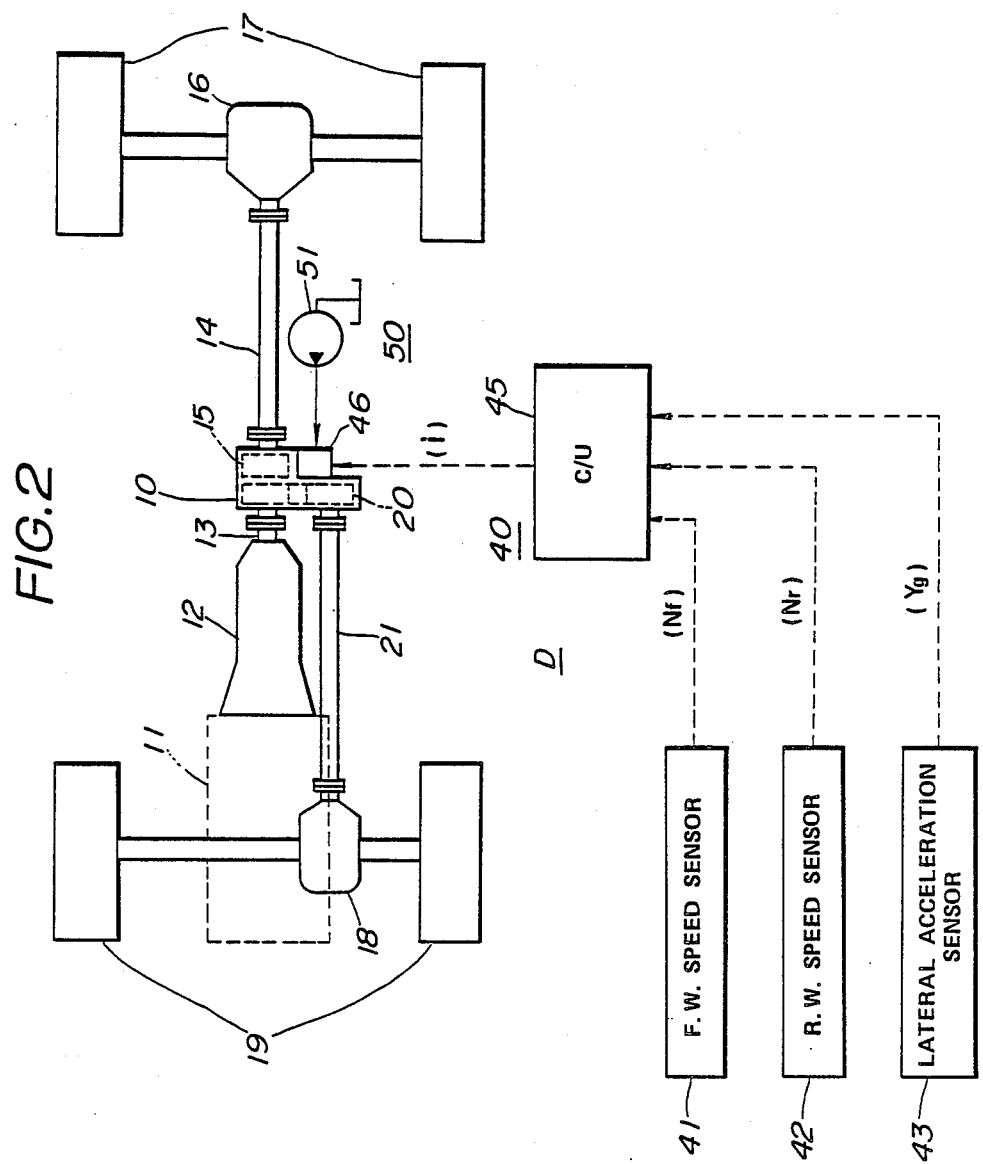
FIG. 2 is a view showing a four wheel drive (4WD) vehicle equipped with a driving force distribution control system of a first or third embodiment of the present invention.

A driving force distribution control system D shown in FIG. 2 is arranged to control a 4WD vehicle based on a rear wheel drive. The 4WD vehicle of FIG. 2 includes transfer mechanism 10, engine (prime mover) 11, transmission 12, transfer input shaft 13, rear drive shaft 14, multiple disc friction transfer clutch 15, rear differential 16, rear wheels 17, front differential 18, front wheels 19, gear train 20, and front drive shaft 21.

Figure 3:
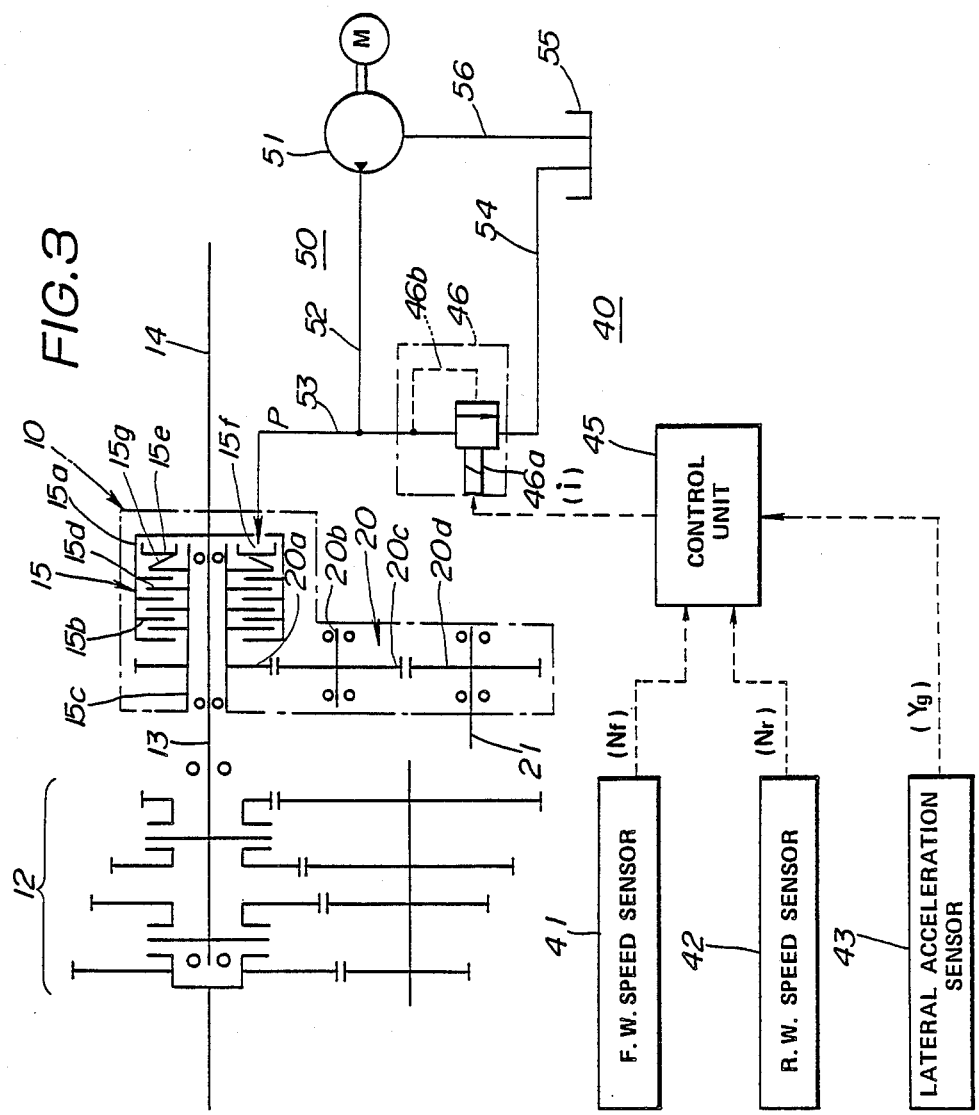
FIG. 3 is a schematic view showing the control system of the first or third embodiment more in detail.

The transmission 12 transmits torque from the engine 11 to the transfer 10, and changes the ratio between engine revolutions and driving wheel revolutions. The transmission 12 of this example uses a system of gears of various sizes mounted on two parallel shafts, as shown in FIG. 3.

The torque is transmitted from the transmission 12 to the transfer 10 through the transfer input shaft 13. The transfer input shaft 13 and the rear drive shaft 14 are mounted in line, and connected with each other so that the drive torque is directly transmitted from the transfer input shaft 13 to the rear drive shaft 14 for driving the rear wheels 17.

The transfer clutch 15 is disposed at a point in a path for transmitting torque to the front wheels 19, and is capable of varying the driving torque transmitted to the front wheels 19. As shown in FIG. 3, the transfer clutch 15 includes a clutch drum 15a fixed with the transfer input shaft 13 and the rear drive shaft 14, friction plates 15b engaged with the clutch drum 15a so as to prevent relative rotation therebetween, a clutch hub 15c rotatably mounted on the transfer input shaft 13, friction discs 15d engaged with the clutch hub 15c so as to prevent relative rotation therebetween and alternated with the friction plates 15b, a clutch pistion 15e provided at one side of the alternating pack of the friction plates and discs 15b and 15d, and a cylinder chamber 15f formed between the clutch piston 15e and the clutch drum 15a.

The gear train 20 of the transfer 10 includes a first gear 20a provided in the clutch hub 15c of the transfer clutch 15, a second gear 20c provided in an intermediate shaft 20b, and a third gear 20d provided in the front drive shaft 21. When the transfer clutch 15 is engaged, the drive torque is transmitted through the transfer clutch 15 and the gear train 20 to the front drive shaft 21 for driving the front wheels 19.

Figure 4:
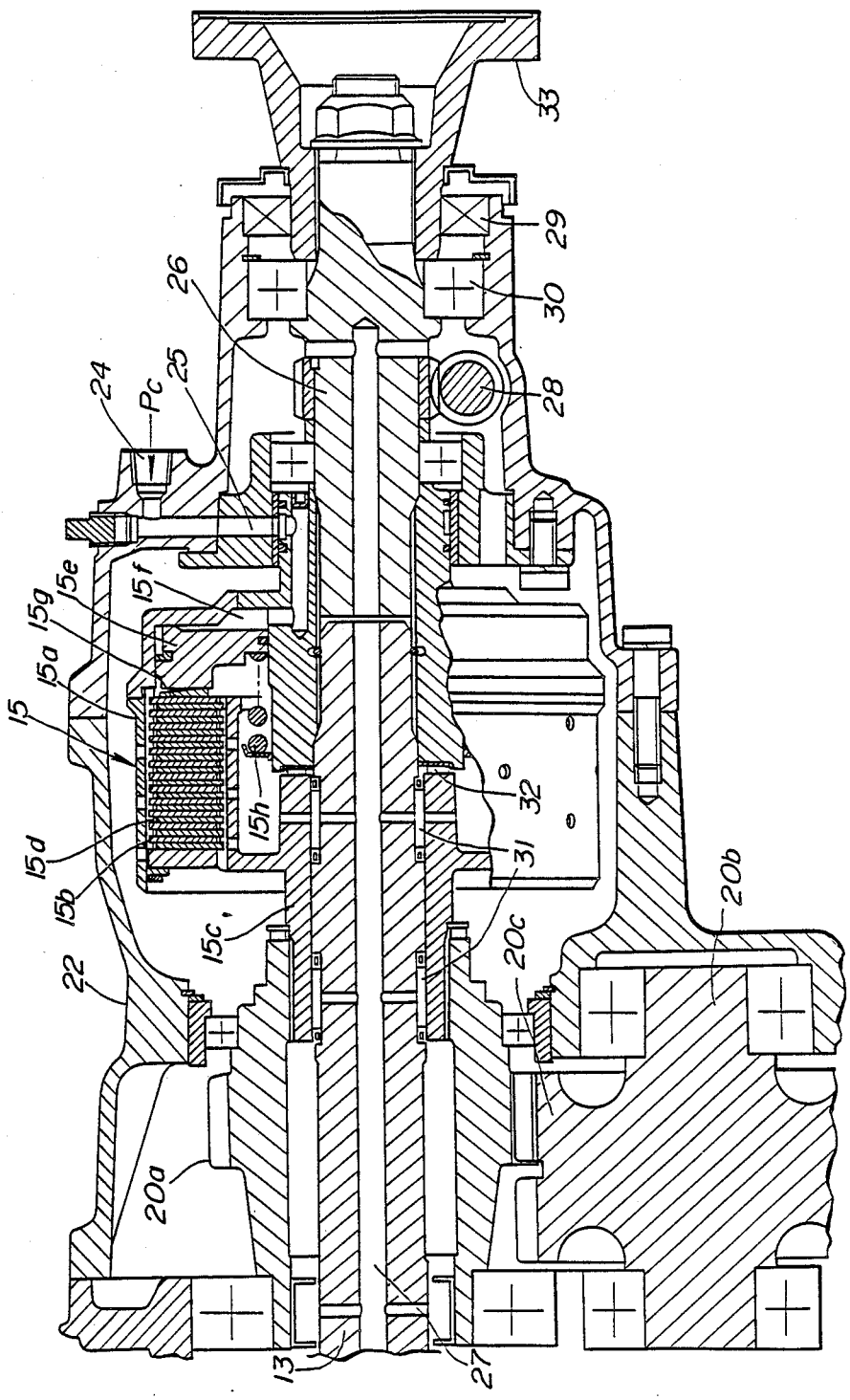
FIG. 4 is a sectional view of a transfer including a transfer clutch, usable in the first, second and third embodiments of the present invention.

FIG. 4 shows one example of the transfer 10. The transfer clutch 15, the gear train 20 and other components are enclosed in a transfer housing 22. The transfer 15 of FIG. 4 further includes a dish plate 15g, a return spring 15h, a clutch oil inlet port 24, a clutch oil passage 25, a rear output shaft 26, a lubricating oil passage 27, a pinion 28 for speed measurement, an oil seal 29, a bearing 30, needle bearings 31, a thrust bearing 32, and a coupling flange 33. In this example, the transfer input shaft 13 and the rear drive shaft 14 are connected through the rear output shaft 26.

As shown in FIG. 3, the driving force distribution control system D of this embodiment includes a pressure source 50 for producing an oil pressure to engage the transfer clutch 15, and a pressure control device 40 for producing a clutch pressure P by controlling the oil pressure of the pressure source 50.

The pressure source 50 includes an oil pump 51, a pump pressure passage 52, a clutch pressure passage 53, a drain passage 54, a reservoir tank 55 and a suction passage 56. The pressure control device 40 includes an electromagnetic proportional relief valve 46 disposed in the drain passage 54. The relief valve 46 includes a solenoid 46a and a check oil passage 46b.

The driving force distribution control system D includes a front wheel revolution speed sensor 41, a rear wheel revolution speed sensor 42, a lateral acceleration sensor 43 and a control unit 45.

The front and rear wheel speeds can be sensed at various positions in the drive system by using various types of sensors. For example, the front and rear wheel speed sensors 41 and 42 are provided, respectively, in the front drive shaft 21 and the rear drive shaft 14, and each sensor includes a sensor rotor fixed with the shaft 21 or 14, and a pickup disposed near the sensor rotor, for detecting a change in magnetic force. Alternatively, each of the front and rear wheel speed sensors 41 and 42 may be disposed at or near the wheels 19 or 17. The front and rear wheel speed sensors 41 and 42, respectively, produce front wheel speed signal (Nf) and rear wheel speed signal (Nr), which are sinusoidal signals, for example.

A G sensor is used as the lateral acceleration sensor 43. The lateral acceleration sensor 43 senses a lateral acceleration Yg of the vehicle, and produces a lateral acceleration signal (Yg).

Figure 5:
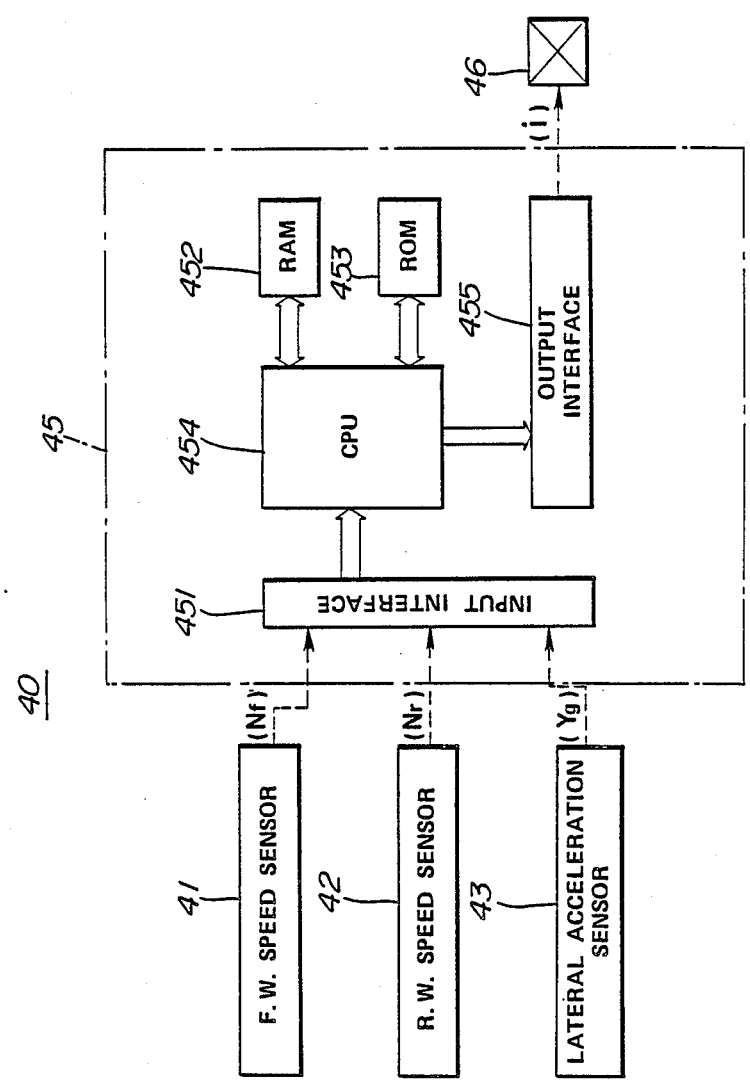
FIG. 5 is a block diagram showing a control unit of the first or third embodiment.
Figure 8:
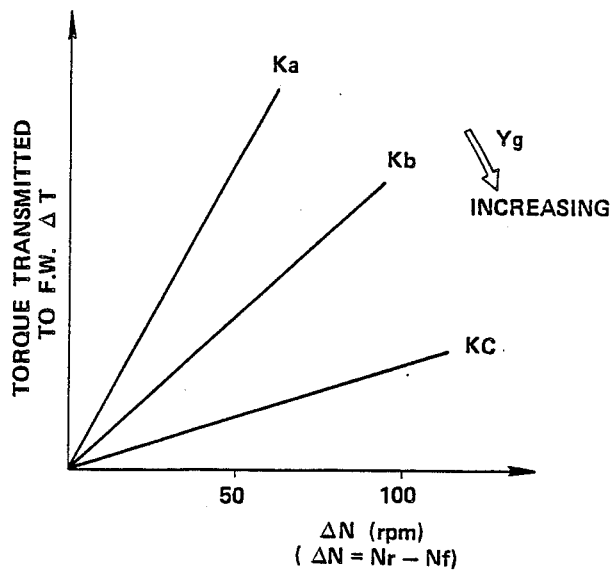
FIG. 8 is a graph showing various forms of a driving force distribution control characteristic of the first embodiment between the torque transmitted to the front wheels and a speed difference between a revolving speed of the front wheels and a revolving speed of the rear wheels.

A main component of the control unit 45 of this embodiment is a microcomputer mounted on the vehicle. The main functions of the control unit 45 are to calculate a speed difference $\Delta N$ ($=Nr-Nf$) between the front and rear drive shafts 21 and 14 from the speed signals (nf) and (nr) inputted from the front and rear wheel speed sensors 41 and 42, and to control the driving torque distribution between the front and rear wheels 19 and 17 by sending a current control signal (i) to the electromagnetic valve 46. As the speed difference $\Delta N$ increases, the control unit 45 varies the driving torque distribution toward the four wheel drive state by increasing a front drive torque $\Delta T$ which is a driving torque transmitted through the transfer clutch 15 to the front wheels 19 (i.e., the clutch pressure P). Furthermore, the control unit 45 receives the lateral acceleration signal (yg) from the lateral acceleration sensor 43, and modifies a control characteristic between $\Delta T$ and $\Delta N$ in accordance with the lateral acceleration Yg. As shown in FIG. 5, the control unit 45 of this embodiment includes input interface 451, RAM 452, ROM 453, CPU 454 and output interface 455. In the ROOM (read only memory) 453, the control characteristic between the front drive torque $\Delta T$ and the front and rear wheel speed difference $\Delta N$ is stored in the form of a mathematical equation expressed by $\Delta T = Kt \cdot \Delta N$ (where Kt is a control constant). FIG. 8 shows the control characteristic used in the first embodiment.

Figure 6:
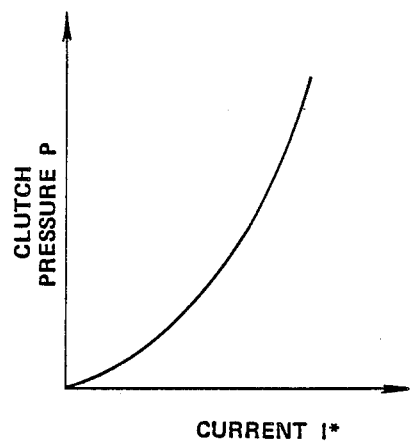
FIG. 6 is a graph showing a characteristic between a clutch pressure of the transfer clutch and an actuating current.

The electromagnetic proportional relief valve 46 is arranged to make the clutch pressure P of the transfer clutch 15 equal to zero (P=0) when a current value I* of the control signal (i) is equal to zero (I*=0). When I*>0, the valve 46 moves toward its closed position to regulate the oil flow in the drain passage 54, and increases the clutch pressure P to a value corresponding to the current value I* by controlling the output pressure of the pump 51, as shown in FIG. 6.

Figure 7:
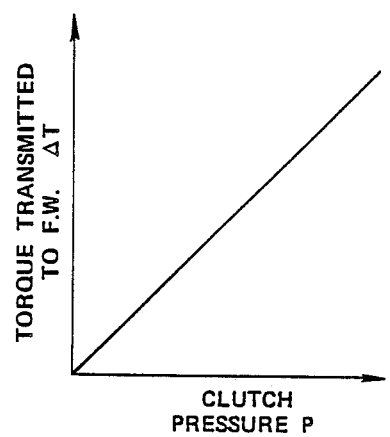
FIG. 7 is a graph showing a characteristic between a torque transmitted through the transfer clutch to the front wheels and the clutch pressure of the transfer clutch.

The transfer clutch 15 varies the front drive torque $\Delta T$ transmitted therethrough in accordance with the clutch pressure P. FIG. 7 shows the relationship between ΔT and P, which is given by the following equation;

$$P = \Delta T/(\mu \cdot S \cdot 2n \cdot Rm)$$

where μ is a friction coefficient between the friction plates and discs, S is an area of the piston on which the pressure is applied, n is the number of the friction discs, and Rm is a radius effective for torque transmission, of friction discs. Therefore, the front drive torque ΔT is increased in proportion to the clutch pressure P.

The driving torque distribution control system of the first embodiment is operated as described below.

The control system of the first embodiment is characterized by use of the lateral acceleration sensor 43 for directly sensing the lateral acceleration, and by the control characteristic in which ΔT is increased along a straight line with an increase in ΔN, as shown in FIG. 8.

Figure 9:
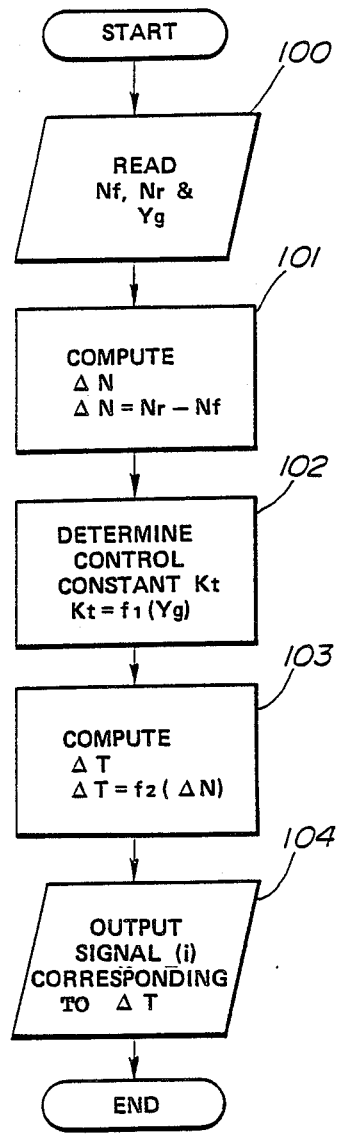
FIG. 9 is a flow chart showing control operations of the first embodiment.

FIG. 9 is a flowchart showing operations of the control system of the first embodiment.

At a step 100 of FIG. 9, the control unit 45 reads the front wheel speed Nf, the rear wheel speed Nr and the lateral acceleration Yg from the sensors 41, 42 and 43.

At a next step 101, the control unit 45 calculates the front and rear wheel speed difference ΔN from Nf and Nr obtained at the step 100 by using the equation, $\Delta N = Nr - Nf$.

At a step 102, the control unit 45 determines the control constant Kt from the lateral acceleration Yg obtained at the step 100, according to the equation $Kt = f_1(Yg)$. In this embodiment, $Kt = Ka$ when $0 \leq Yg < Y1$; $Kt = Kb$ when $Y1 \leq Yg < Y2$; and $Kt = Kc$ when $Y2 \leq Yg$; where Ka, Kb and Kc are constant values and $Ka > Kb > Kc$.

At a step 103, the control unit 45 determines the front drive torque ΔT by using ΔN obtained at the step 101 and the control constant Kt determined at the step 102. The operation of the step 103 is expressed by $\Delta T = f_2(\Delta N)$. In this embodiment, $\Delta T = Kt \cdot \Delta N$ when $\Delta N \geq 0$, and $\Delta T = 0$ when $\Delta N < 0$.

In this embodiment, the control constant Kt is changed in a stepwise manner, and the control constant Kt assumes three discrete predetermined values. However, the control constant Kt may be varied continuously in inverse proportion to the lateral acceleration Yg (For example, $Kt = Ka/Yg$ where $Kc < Kt < Ka$). Furthermore, it is possible to determine the front drive torque ΔT directly from Yg and ΔN without the separate step for determining Kt.

At a step 104, the control unit 45 outputs the control signal (i) having the current value I* by which the clutch pressure P corresponding to the front drive torque ΔT determined at the step 103 can be obtained.

The driving force distribution control system D of the first embodiment has the following advantages.

(1) The control system of this embodiment can obtain information on the friction coefficient of a road surface by monitoring the lateral acceleration Yg with the sensor 43, without using any road surface condition sensor such as a sensor for sensing a road surface friction coefficient. Most importantly, the control unit can judge that the vehicle is in a turning movement on a road surface having a high friction coefficient by detecting high values of the lateral acceleration Yg.

(2) When the lateral acceleration Yg is high, the control system uses the control characteristic having a low rate of increase of the clutch pressure P with respect to the speed difference ΔN (for example, the characteristic determined by the control constant Kc). In this case, the control system holds the front drive torque ΔT transmitted to the front wheels 19 low, and the driving torque distribution near the two wheel drive state. Therefore, the control system of this embodiment can prevent drift-out from readily occurring, and can provide a satisfactory cornering behavior on the road surface of a high friction coefficient.

(3) When the lateral acceleration Yg is low (for example, when the vehicle is moving straight ahead, or starting, or turning on a road surface of a low friction coefficient), this control system uses the control characteristic of a high rate of increase of the clutch pressure (such as the characteristic determined by the control constant value Ka). Therefore, this control system increases the tendency of the driving force distribution toward 4WD by increasing the front drive torque ΔT, so that the ability of starting and the ability in straight ahead driving can be improved, and spin and drift-out can be prevented from readily occurring.

(4) The control system of the first embodiment changes the control characteristic by changing the control constant Kt. Therefore, the memory section of the control unit of the first embodiment need not have a large storage capacity, but is only required to store one mathematical equation.

Figure 10:
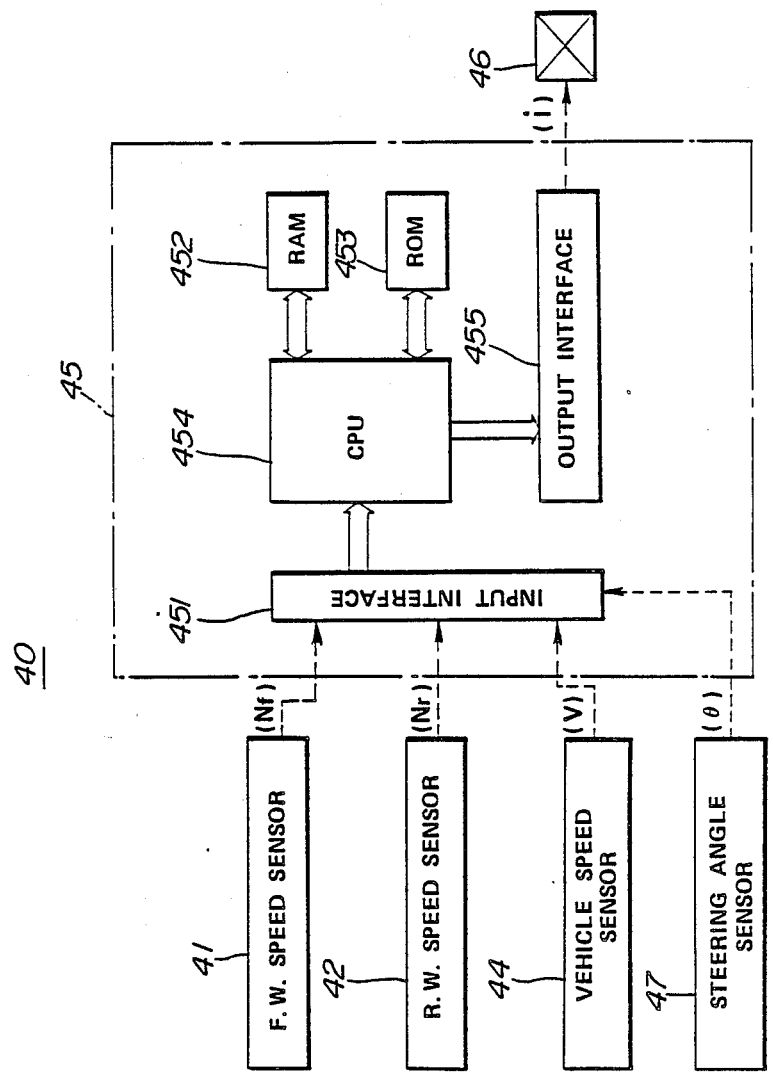
FIG. 10 is a block diagram showing the control system of the second embodiment.
Figure 11:
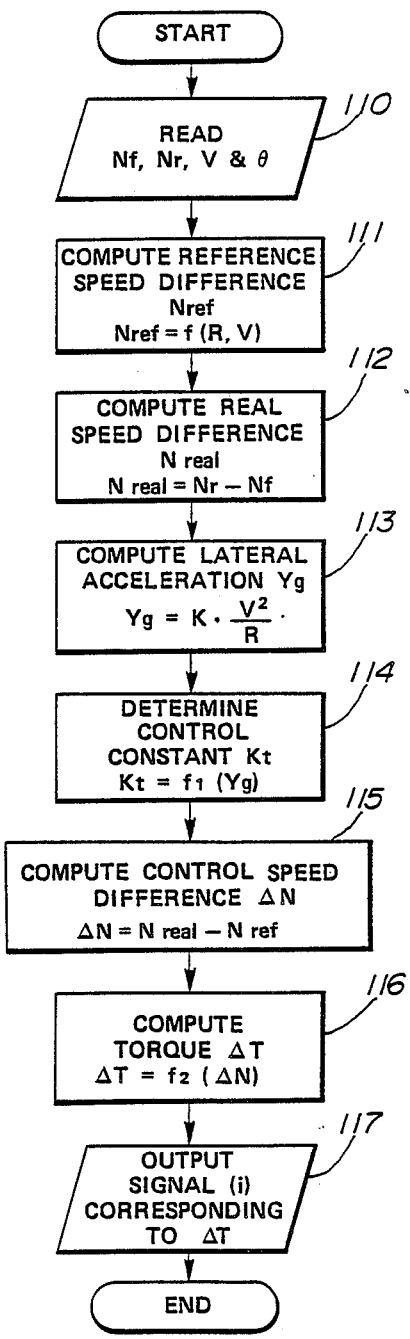
FIG. 11 is a flow chart showing the control operations of the second embodiment.

A second embodiment of the present invention is shown in FIGS. 10 and 11.

The driving force distribution control system of the second embodiment is basically the same as that of the first embodiment. However, as shown in FIG. 10, the control system of the second embodiment employs, instead of the lateral acceleration sensor 43 of FIG. 5, a vehicle speed sensor 44 for sensing a vehicle speed V and producing a vehicle speed signal (V), and a steering angle sensor 47 for sensing a steering angle θ (such as a steering wheel angle) and producing a steering angle signal (θ). Furthermore, as shown in FIG. 11, the control unit 45 of the second embodiment is arranged to determine the lateral acceleration Yg by estimation, and to correct the front and rear speed difference ΔN to eliminate influence of a turning radius.

At a step 110 of FIG. 11, the control unit 45 of FIG. 10 reads the front wheel speed Nf, rear wheel speed Nr, vehicle speed V and steering angle θ sensed by the sensors 41, 42, 44 and 47, respectively.

At a next step 111, the control unit 45 computes a turning radius R from the vehicle speed V and steering angle θ obtained at the step 110, and then computes a reference front and rear wheel speed difference Nref from the turning radius R and vehicle speed V. The computation of the turning radius R is expressed by $R = f(\theta, V)$, and the computation of Nref is expressed by $Nref = f(R, V)$.

Alternatively, it is possible to determine the vehicle speed V and turning radius R by using sensors for sensing a speed of revolution Nfl of the left front wheel 19 and a speed of revolution Nfr of the right front wheel 19 instead of the combination of the vehicle speed sensor 44 and steering angle sensor 47. In this case, V and R are obtained by using the following equations.

$$V = (1/2) \cdot (Nfl - Nfr)$$

$$\Delta w = Nfl - Nfr$$

$$R = K \cdot V/\Delta w$$

At a step 112, the control unit 45 computes a real front and rear wheel speed difference Nreal from the front and rear wheel speeds Nf and Nr obtained at the step 110. The computation is expressed by $Nreal = Nr - Nf$.

At a step 113, the control unit 45 determines the lateral acceleration Yg from the vehicle speed V, turning radius R and a constant K by a computation which is expressed as $Yg = K \cdot (V^2/R)$.

A step 114 is substantially the same as the step 102 of FIG. 9. At the step 114, the control unit 45 determines the control constant Kt from the lateral acceleration Yg obtained at the step 113, in the same manner as the step 102.

At a step 115, the control unit 45 determines a control front and rear wheel speed difference $\Delta N$ from the reference speed difference Nref obtained at the step 111, and the real speed difference Nreal obtained at the step 112. The computation is expressed as $\Delta N = Nreal - Nref$. Thus, the control system of the second embodiment is arranged to eliminate influence of the turning radius R on the front and rear wheel speed difference by subtracting Nref from Nreal.

A step 116 is substantially the same as the step 103 of FIG. 9. At the step 116, the control unit 45 computes the front drive torque $\Delta T$ from the control front and rear wheel speed difference $\Delta N$ obtained at the step 115, in the same manner as the step 103.

At a step 117, the control unit 45 outputs the control signal (i) of the current value I* to obtain the clutch pressure P corresponding to the front drive torque $\Delta T$ obtained at the step 116.

In the second embodiment, the lateral acceleration Yg is determined by calculation from the vehicle speed and steering angle or from the left and right front wheel speeds. Such an estimation of Yg may involve slight errors because of the friction coefficient of a road surface, but it is still useful for the following reasons.

(a) In general, it is not possible to obtain a sufficient driving force on a road surface having a low friction coefficient. Therefore, the vehicle speed V cannot be increased too much during a turn accompanied by acceleration.

(b) When the front wheels fall into the state of drift on a low friction coefficient road surface, the calculated value of the left and right front wheel speed difference $\Delta w$ becomes small.

(c) When the rear wheels fall into the state of drift on a low friction coefficient road surface, the calculated value of the turning radius R become large because the driver returns the steering wheel in order to prevent spin of the vehicle.

Thus, not only can the control system of the second embodiment estimate the actual lateral acceleration correctly on a high friction coefficient road surface, but also the control system can provide the estimated value closely approximate to the actual lateral acceleration even on a low friction coefficient road surface for the above-mentioned reasons (a)-(c).

The control system of the second embodiment has the following advantages in addition to the advantages of the first embodiment.

(5) The control system can obtain information on the lateral acceleration without using the lateral acceleration sensor, but using the vehicle speed sensor and steering angle sensor which are widely used in various other control systems, or using the left and right front wheel speed sensors.

(6) The front and rear wheel speed difference is corrected so as to eliminate influence of the turning radius. Therefore, the driving force distribution control is performed on the basis of the actually effective front and rear wheel speed difference, so that the accuracy of control is improved.

Figure 12:
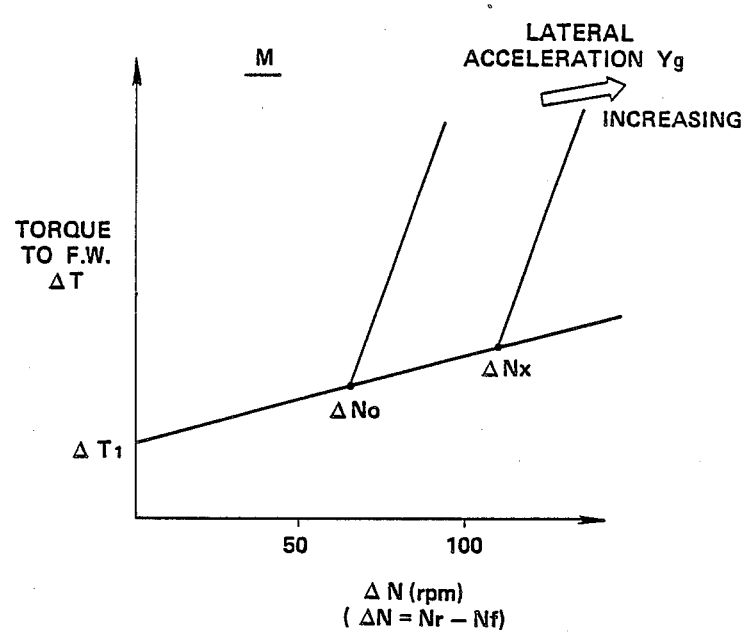
FIG. 12 is a graph showing various forms of the control characteristic of the third embodiment.
Figure 13:
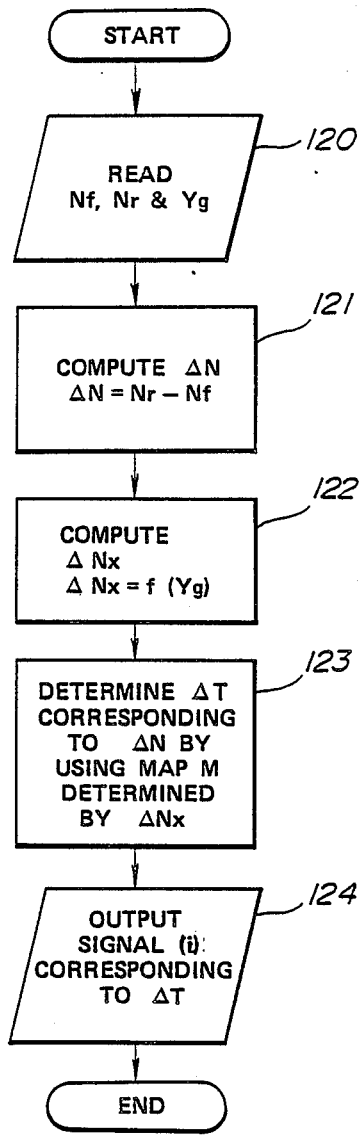
FIG. 13 is a flow chart showing the control operations of the third embodiment.

A third embodiment of the present invention is shown in FIGS. 12 and 13.

The driving force distribution control system of the third embodiment is basically the same as that of the first embodiment. However, the third embodiment is different from the first and second embodiments in the control characteristic between $\Delta T$ and $\Delta N$.

In the third embodiment, as shown in FIG. 12, the front drive torque $\Delta T$ transmitted to the front wheels 19 is increased with an increase of the front and rear wheel speed difference $\Delta N$ along a predetermined gradual straight line until $\Delta N$ reaches a predetermined threshold value $\Delta Nx$. At the threshold value $\Delta Nx$, the front drive torque $\Delta T$ starts rising more steeply. Above the threshold value $\Delta Nx$, the front drive torque $\Delta T$ is increased with an increase of $\Delta N$ along a steep straight line which intersects the gradual straight line at a turning point at which $\Delta N$ is equal to the threshold value. The threshold value $\Delta Nx$ is shifted along the gradual line in accordance with the lateral acceleration Yg. Accordingly, the steep straight line is shifted in accordance with Yg but its slope remains unchanged in this embodiment.

The control system of the third embodiment employs the front wheel speed sensor 41, rear wheel speed sensor 42 and lateral acceleration sensor 43 as in the first embodiment, and is arranged as shown in FIG. 2.

In the flow chart of FIG. 13 showing the operations of the third embodiment, the control unit 45 first reads, at a step 120, the front wheel speed Nf, rear wheel speed Nr and lateral acceleration Yg which are sensed by the sensors 41, 42 and 43, respectively.

At the step 121, the control unit 45 computes the front and rear wheel speed difference $\Delta N$ $(=Nr-Nf)$ by using Nr and Nf obtained at the step 120.

At a step 122, the control unit 45 determines the threshold speed difference value $\Delta Nx$ by computation from the lateral acceleration Yg obtained at the step 120. The computation of the step 122 is expressed as $\Delta Nx = f(Yg)$. The equation used in this embodiment is; $\Delta Nx = K \cdot Yg + \Delta N_0$ where $\Delta N_0$ is a predetermined reference threshold value.

At a step 123, the control unit 45 determines a map, or mapping, M in accordance with the threshold speed difference value $\Delta Nx$ determined at the step 122. The map M is a relationship between $\Delta T$ and $\Delta N$, representing the control characteristic. Then, the control unit 45 determines the front drive torque $\Delta T$ corresponding to the value of the front and rear wheel speed difference $\Delta N$ obtained at the step 121, by using the map M determined by $\Delta Nx$.

At a step 124, the control unit 45 outputs the control signal (i) of the current value I* to achieve the clutch pressure P corresponding to $\Delta T$ determined at the step 123.

The thus-constructed control system of the third embodiment offers the following advantage in addition to the advantages of the first embodiment.

(7) The front drive torque $\Delta T$ is increased gradually with an increase of the front and rear wheel speed difference $\Delta N$ when the speed difference $\Delta N$ is low, and is increased steeply when the speed difference is high, above the threshold value ΔNx. Therefore, both prevention of tight corner braking in a range where ΔN is low, and improvement in performance of starting and acceleration in a range where ΔN is high can be attained simultaneously.

In the present invention, it is possible to use a table look-up instead of calculating ΔT. For example, the control system may be arranged to store a plurality of tables prepared according to different forms of the control characteristic between ΔT and ΔN, and to select one of the tables in accordance with the lateral acceleration Yg.

The clutch oil pressure can be controlled in various manners. For example, it is possible to employ a duty factor control system using a solenoid valve which opens and closes a fluid passage in response to a periodic pulse signal.

It is optional to use an electromagnetic clutch, or a clutch utilizing the viscosity of a fluid or other clutches in place of the multiple disc friction clutch of the preceding embodiments.

What is claimed is:

1. A driving force distribution control system for a vehicle having a prime mover, primary driving wheels and secondary driving wheels, said control system comprisingly:
   a transfer mechanism for transmitting a driving torque from said prime mover to said primary and secondary driving wheels, said transfer mechanism comprising a transfer clutch which is disposed in a drive path to said secondary wheels and capable of varying a clutch engagement force to vary a secondary drive torque transmitted through said transfer clutch to said secondary driving wheels,
   actuating means for actuating said transfer clutch to vary a driving torque distribution between said primary and secondary wheels by varying said clutch engagement force of said transfer clutch in response to a control signal,
   wheel speed difference sensing means for sensing a wheel speed difference between a revolving speed of said primary wheels and a revolving speed of said secondary wheels,
   lateral acceleration sensing means for sensing a lateral acceleration of said vehicle, and
   control means, connected to said wheel speed difference sensing means and said lateral acceleration sensing means, for producing said control signal and for increasing said clutch engagement force more gradually as said wheel speed difference increases when said lateral acceleration is high than when said lateral acceleration is low, said control means further comprising:
   signal producing means for increasing said clutch engagement force of said transfer clutch so as to increase a tendency to a four wheel drive condition with an increase of said wheel speed difference by producing said control signal representing said clutch engagement force in accordance with a control characteristic between said clutch engagement force and said wheel speed difference, and
   characteristic determining means for varying said control characteristic in accordance with said lateral acceleration so that a rate of increase of said clutch engagement force with respect to said wheel speed difference is increased, at least within a limited range of said wheel speed difference, when said lateral acceleration decreases, said characteristic determining means comprising selection means for selecting a predetermined gradual relationship as said control characteristic at least when said lateral acceleration is equal to a predetermined high value, and a predetermined steep relationship at least when said lateral acceleration is equal to a predetermined low value lower than said high value, said gradual and steep relationships being relationships between said clutch engagement force and said wheel speed difference determined so that, for any given value of said wheel speed difference, said clutch engagement force of said steep relationship is equal to or greater than that of said gradual relationship.

2. A control system according to claim 1 wherein said transfer clutch and said actuating means are capable of varying said clutch engagement force continuously, and said control means increases said clutch engagement force continuously and monotonically with an increase of said wheel speed difference.

3. A control system according to claim 2 wherein said control characteristic is linear and can be expressed by a linear equation, and said characteristic determining means comprises means for varying said control characteristic by varying a parameter of said linear equation in accordance with said lateral acceleration.

4. A control system according to claim 3 wherein said primary driving wheels are rear wheels, said secondary driving wheels are front wheels, and said wheel speed difference is a difference resulting from a subtraction of a revolving speed of said front wheels from a revolving speed of said rear wheels.

5. A control system according to claim 4 wherein said control characteristic is expressed by an equation such that said clutch engagement force equals a predetermined fixed quantity plus a product obtained by multiplying said wheel speed difference by said parameter, and said characteristic determining means comprises means for varying said control characteristic by decreasing said parameter with an increase of said lateral acceleration and means for fixing said predetermined fixed quantity irrespective of variation of said lateral acceleration.

6. A control system according to claim 5 wherein said characteristic determining means comprises means for setting said parameter equal to a predetermined high parameter value when said lateral acceleration is equal to or greater than zero and smaller than a predetermined first value, to a predetermined middle parameter value lower than said high parameter value when said lateral acceleration is equal to or greater than said first value and smaller than a predetermined second value which is higher than said first value, and to a predetermined low parameter value when said lateral acceleration is equal to or greater than said second value.

7. A control system according to claim 6 wherein said lateral acceleration sensing means comprises a lateral acceleration sensor.

8. A control system according to claim 6 wherein said lateral acceleration sensing means comprises a vehicle speed sensor for sensing a vehicle speed of said vehicle, and a steering angle sensor for sensing a steering angle of said vehicle, and said control means comprises means for estimating said lateral acceleration from said vehicle speed and said steering angle.

9. A control system according to claim 8 wherein said control means comprises means for determining a turning radius of said vehicle from said vehicle speed and said steering angle using a predetermined first mathematical equation, means for determining a reference value of said wheel speed difference from said turning radius and said vehicle speed using a predetermined second mathematical equation, and means for determining a corrected value of said wheel speed difference, said corrected value equal to a difference resulting from subtraction of said reference value of said wheel speed difference from a real value of said wheel speed difference determined directly from an output signal of said wheel speed difference sensing means.

10. A control system according to claim wherein said control characteristic is such that said clutch engagement force is increased gradually with an increase of said wheel speed difference at a predetermined first constant rate until said wheel speed difference becomes equal to a value of said parameter, and is increased steeply with a further increase of said wheel speed difference above said value of said parameter at a predetermined second constant rate which is higher than said first constant rate, and said characteristic determining means comprises means for varying said control characteristic by increasing said parameter when said lateral acceleration increases.

* * * * *